J. HUTHER.

Improvement in Saws.

No. 122,320. Patented Jan. 2, 1872.

Witnesses.
J. H. Burridge
M. R. Hover

Inventor.
J. Huther.
per Burridge & Co.
Attys

UNITED STATES PATENT OFFICE.

JOHN HUTHER, OF CLEVELAND, OHIO.

IMPROVEMENT IN SAWS.

Specification forming part of Letters Patent No. 122,320, dated January 2, 1872.

*To all whom it may concern:*

Be it known that I, JOHN HUTHER, of Cleveland, in the county of Cuyahoga and State of Ohio, have invented a certain new and Improved Cross-Cut Saw; and I do hereby declare that the following is a full, clear, and complete description thereof, reference being had to the accompanying drawing making part of the same.

SPECIFICATION.

Figure 1:
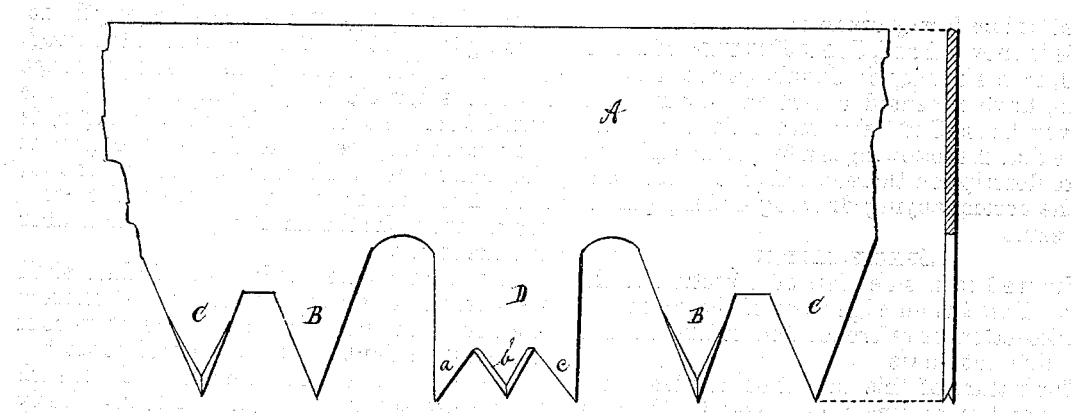
Figure 2:

Figure 1 is a side view of a section of the saw. Fig. 2 is an edge view of the teeth.

Like letters of reference denote like parts in the different views.

The nature of this invention relates to the shape and arrangement of the teeth of a cross-cut saw; and the object thereof is to cause the cuttings of the saw to be chopped up into fine dust and thrown from the kerf by the raking-teeth, whereby the saw is made to saw freer and easier than saws in ordinary use.

The following is a more full and complete description of said saw.

In the drawing, Fig. 1, A represents a section of a saw, of which B C are the cutting-teeth. Said teeth are of the ordinary shape and size, and filed in the usual way for the cutting edge. D is a raking-tooth, and which is of the shape shown in Fig. 1. The end of said tooth, as will be seen, consists of three points, $a\ b\ c$, the points $a$ and $c$ being duplicates, and of the shape shown. The sides or edges of said tooth are not cutting, but are filed square across, as shown at $a\ c$, Fig. 2. The central point $b$ is of the shape of a fleam, and, like that instrument, is so filed as to have two sharp cutting-edges, as shown in Fig. 2, so that it will cut in either direction that the saw may move.

This class of saws are usually provided with more or less raking-teeth, but said teeth have no fleam or central cutting-tooth between them, each tooth being simply a tooth without a cutting-edge for the purpose of raking out the saw-cuttings from the kerf. Said cuttings or sawdust is usually of considerable length, according to the strength of the fiber of the wood. When the fiber is tough the dust or cuttings is of considerable length, and, therefore, it is raked from the kerf with more or less labor, as the length may be. The shorter the dust is the easier it is raked out; and so, *per contra,* if the fiber is long in consequence of the great toughness of the timber, it requires much labor to rake it out.

In order that the cuttings or sawdust shall be short and fine, so that it can be raked from the kerf with but little labor, is the purpose of the fleam or double-cutting pointed tooth $b$.

The set given to the cutting-teeth C B is such as to allow the raking-teeth $a\ c$ to run freely in the kerf. In consequence of said raking-teeth not filling the thickness of the kerf some of the sawdust passes by the points $a\ c$ and more or less under them, which is immediately cut up into much finer dust by the central double-edged tooth or fleam $b$, thereby preventing it from lodging in the kerf and binding the saw, as the finer the sawdust the more easily it is thrown out by the saw-teeth.

In thus associating with the raking-teeth a fleam-tooth, as above described, the saw is found to run with much less labor than when the raking-teeth only are used without a fleam in the usual way.

Claim.

What I claim as my invention, and desire to secure by Letters Patent, is—

The herein-described raking-tooth D, consisting of the points $a\ c$ and central point $b$, as constructed and arranged in relation to each other and to the cutting-teeth C B in the manner as and for the purpose set forth.

JOHN HUTHER.

Witnesses:
J. H. BURRIDGE,
D. L. HUMPHREY.

(130)